United States Patent [19]
Ganster et al.

[11] Patent Number: 6,087,439
[45] Date of Patent: Jul. 11, 2000

[54] AQUEOUS CROSSLINKING POLYMER DISPERSIONS AND THEIR USE FOR THE PREPARATION OF WATER-BASED ADHESIVES

[75] Inventors: Otto Ganster, Odenthal; Jörg Büchner; Heinz-Werner Lucas, both of Bergisch Gladbach, all of Germany

[73] Assignee: Bayer AG, Leverkusen, Germany

[21] Appl. No.: 09/015,126

[22] Filed: Jan. 29, 1998

[30] Foreign Application Priority Data

Feb. 5, 1997 [DE] Germany ............ 197 04 245

[51] Int. Cl.$^7$ .................................... C08J 3/20
[52] U.S. Cl. ................ 524/591; 528/75; 528/905; 524/468; 524/500; 524/567; 524/571; 524/589; 524/801; 524/839
[58] Field of Search ............ 528/75, 909; 524/468, 524/500, 589, 567, 591, 571, 801, 839

[56] References Cited

U.S. PATENT DOCUMENTS 4,663,377  5/1987  Hombach et al. .
5,200,489  4/1993  Jacobs .

FOREIGN PATENT DOCUMENTS 161373  11/1985  European Pat. Off. .
540985  5/1993  European Pat. Off. .

OTHER PUBLICATIONS

Derwent Abstract, JP 53 056 232, May 22, 1978.
Ullmann (4), 13, pp. 614–617.

*Primary Examiner*—Samuel A. Acquah
*Attorney, Agent, or Firm*—Connolly Bove Lodge & Hutz LLP

[57] ABSTRACT

The invention relates to aqueous crosslinking polymer dispersions which are characterized in that they consist of A) 98 to 80 wt. % of a 40 to 60% aqueous alkaline polymer dispersion based on 2-chlorobuta-1,3-diene, with a pH of $\geq 9.5$ and a chloride content, arising from the elimination of chlorine atoms from the polymer, of $\geq 300$ ppm, and B) 2 to 20 wt. % of polyisocyanates obtained by the cyclotrimerization of aliphatic and/or cycloaliphatic diisocyanates, containing NCO groups bonded predominantly or exclusively as secondary groups, and to their use for the preparation of water-based adhesives.

4 Claims, No Drawings

AQUEOUS CROSSLINKING POLYMER DISPERSIONS AND THEIR USE FOR THE PREPARATION OF WATER-BASED ADHESIVES

The present invention relates to aqueous crosslinking polymer dispersions consisting of aqueous alkaline polymers based on 2-chlorobuta-1,3-diene and of polyisocyanates obtained by the cyclotrimerization of aliphatic and/or cycloaliphatic diisocyanates, and to their use for the preparation of water-based adhesives.

The importance of water-based adhesives has increased considerably in recent years because of the efforts made by the adhesives manufacturers and processors to reduce solvent emissions and eliminate fire risk. An example of this development is the transition from PU solvent-based adhesives to the corresponding PU dispersion adhesives, as can be observed in the furniture industry, the automotive industry and the shoe industry. This successful transition was possible because, corresponding to the isocyanate crosslinking known for many years in the case of solvent systems, crosslinking can now also be carried out in aqueous dispersion systems with suitable isocyanate crosslinking agents.

Thus EP-A-206 059 describes a water-dispersible polyisocyanate preparation which is suitable as an additive for water-based adhesives. In practice, however, it is found that the polyisocyanate preparation described in EP-A-206 059, which is based on 1,6-diisocyanatohexane (HDI), leads to virtually insuperable problems when attempting to crosslink adhesives based on strongly alkaline, aqueous polymer dispersions because the polymer dispersion of 2-chlorobuta-1,3-diene obtained after dispersion of the crosslinking isocyanates based on HDI gels within a short time and the dried adhesive film no longer allows reproducible bonding. EP-A-206059 also describes examples using crosslinking isocyanates based on IPDI for pH-neutral or slightly acidic polymer dispersions. On the other hand, practice trials with alkaline polymer dispersions on the basis of 2-Chlorobuta-1,3-diene ordinarily result adhesives with rather unsatisfactory properties at higher temperatures.

Thus the object of the present invention is to provide suitable adhesives based on strongly alkaline polymers or copolymers of 2-chlorobuta-1,3-diene, which have a high heat stability and a sufficiently long processing time without the adhesive mixture gelling or coagulating.

The object was achieved by the provision of the aqueous crosslinking polymer dispersions according to the invention, consisting of aqueous alkaline polymer dispersions based on 2-chlorobuta-1,3-diene and of aliphatic and/or cycloaliphatic polyisocyanates containing NCO groups bonded predominantly or exclusively as secondary groups.

The present invention accordingly provides aqueous crosslinking polymer dispersions which are characterized in that they consist of A) 98 to 80 wt. % of a 40 to 60% aqueous alkaline polymer dispersion based on 2-chlorobuta-1,3-diene, with a pH of $\geq 9.5$ and a chloride content, arising from the elimination of chloride ions from the polymer, of $\geq 300$ ppm, and B) 2 to 20 wt. % of polyisocyanates obtained by the cyclotrimerization of aliphatic and/or cycloaliphatic diisocyanates, containing NCO groups bonded predominantly or exclusively as secondary groups.

Preferred aqueous crosslinking polymer dispersions are those containing 95 to 90 wt. % of component A) and 5 to 10 wt. % of component B).

Component A) is preferably used in the form of a 50 to 60% aqueous alkaline polymer dispersion with a pH preferably of 11–13 and a chloride content, arising from the elimination of chloride ions from the polymer, preferably of $\geq 400$ ppm.

It is important for the polymer dispersions according to the invention that the aqueous polymer dispersion of 2-chlorobuta-1,3-diene contains a certain proportion of OH groups crosslinkable with isocyanate, which is obtained by the elimination of chloride ions from the 2-chlorobutadiene polymer. This considerably increases the crosslinkability of the 2-chlorobutadiene polymers with the isocyanates. The elimination of the chloride ions from the 2-chlorobutadiene polymer can be effected in conventional manner by storing the aqueous alkaline polymer dispersion at room temperature, or accelerated by a heat treatment, preferably at temperatures of 40 to 90° C.

The pH of the aqueous alkaline polymer dispersion of 2-chlorobutadiene results from appropriate contents of alkali metal hydroxide and/or alkali soaps, which are required for the chemical, microbial or colloidochemical stabilization of the polymer dispersions.

The aqueous alkaline polymer dispersions based on 2-chlorobuta-1,3-diene to be used according to the invention as component A) can be prepared in conventional manner, e.g. by the emulsion polymerization of 2-chlorobuta-1,3-diene as described in Ullmann (4.) 13, 614–617. Of course, it is also possible to use copolymers of 2-chlorobuta-1,3-diene with other olefinically unsaturated monomers, e.g. 2,3-dichlorobutadiene or methacrylic acid, as component A). Such copolymers are also known and are described for example in the reference cited above.

In addition to component A), the aqueous crosslinking polymer dispersions according to the invention contain so-called crosslinking isocyanates as component B); these are obtained by the cyclotrimerization of aliphatic and/or cycloaliphatic diisocyanates and are polyisocyanates containing NCO groups bonded predominantly or exclusively as secondary groups.

Polyisocyanates containing NCO groups bonded predominantly as secondary groups are B1) either those for which the diisocyanates used as starting materials for the cyclotrimerization possess no primary NCO groups on the basis of their chemical structure, e.g. 4,4'-diisocyanatodicyclohexylmethane (Desmodur W®, Bayer AG), or those B2) polyisocyanates for which the diisocyanates used as starting materials for the cyclotrimerization also contain primary NCO groups in addition to secondary NCO groups, e.g. 1-isocyanato-3,3,5-trimethyl-5-isocyanato-methylcyclohexane (isophorone diisocyanate, Bayer AG). Because of the difference in reactivity between primary and secondary/tertiary NCO groups, the more reactive primary NCO groups react preferentially during the trimerization reaction, leaving predominantly the less reactive secondary NCO groups intact in the polyisocyanate obtained.

Suitable starting diisocyanates for the preparation of component B) according to the invention are especially 4,4'-diisocyanatodicyclohexylmethane (Desmodur W, Bayer AG) and isophorone diisocyanate (IPDI, Bayer AG).

Preferred polyisocyanates are cyclotrimerization products of isophorone diisocyanate.

The cyclotrimerization products of aliphatic and/or cycloaliphatic polyisocyanates containing NCO groups bonded predominantly or exclusively as secondary groups, to be used according to the invention as component B), contain the starting isocyanates (residual monomers) in an amount of less than 0.5 wt. %, preferably less than 0.2 wt.

%. Of course, suitable emulsifiers can also be added to component B), the amount of emulsifier being chosen so that the polyisocyanates (component B)) are readily dispersible in the dispersion to be crosslinked (component A)). Suitable emulsifiers are especially reaction products of aliphatic polyisocyanates with non-ionic polyether alcohols containing ethylene oxide units, the NCO/OH equivalent ratio being at least 1:1, generally 2:1 to 1000:1. Examples of suitable polyether alcohols are alkoxylation products preferably of monohydric or polyhydric starter molecules like methanol, n-butanol, cyclohexanol, 3-methyl-3-hydroxymethyloxetane, phenol, ethylene glycol, propylene glycol, trimethylolpropane and glycerol, which have at least one polyether chain generally containing 10 to 70 ethylene oxide units. The corresponding monohydric polyether alcohols are particularly suitable for the preparation of emulsifiers. The preparation and composition of such emulsifiers are described in EP-A-206 059. The amount of emulsifiers conventionally added to component B) is 0.1 to 20 wt. %, preferably 5 to 15 wt. %, based on the polyisocyanate used.

Small amounts, generally amounts of ≦35 wt. %, of organic solvents, such as acetone, ethyl acetate, methoxypropyl acetate, propylene carbonate, xylene and/or Solvesso (a Shell product), can also be added to component B) in order to lower the viscosity.

Furthermore, the aqueous crosslinking polymer dispersions according to the invention can also contain auxiliary substances and additives conventionally used in adhesives technology. These include, for example, filers such as quartz powder, zinc oxide, highly disperse silicic acid, calcium carbonate, chalk, dolomite or talcum, which are often used together with wetting agents, e.g. polyphosphates or naphthalenesulphonic acid salts, the wetting agents generally being added in amounts of 0.2 to 0.6 wt. %, based on the filler used. The amount of fillers to be added is conventionally 0.1 to 15 wt. %, based on the content of 2-chlorobutadiene polymer.

Other suitable auxiliary substances are organic thickeners such as cellulose derivatives, alginates, starch or starch derivatives or polyacrylic acid, to be used e.g. in amounts of 0.01 to 1 wt. %, based on the total polymer dispersion, or inorganic thickeners such as bentonites, to be used in amounts of 0.05 to 5 wt. %., based on the total polymer dispersion. Furthermore, to preserve the adhesive, it is also possible to add fungicides in amounts conventionally of 0.2 to 1 wt. %, again based on the total amount of polymer dispersion.

Tackifying resins, e.g. natural resins, modified resins like rosin esters or terpene/phenol resins, or synthetic resins like phthalate resins, can also be mixed with the polymer dispersion according to the invention in proportions of up to 40 wt. %, based on the content of 2-chlorobutadiene polymer.

The aqueous polymer dispersions according to the invention are suitable for bonding any materials of identical or different types, e.g. for bonding wood and paper, plastics, foams, textiles, leather and inorganic materials like ceramic, earthenware or asbestos cement.

The use of the polymer dispersions according to the invention surprisingly effects a marked improvement in the heat stability, combined with an improved processing time (at least 5 hours), compared with prior art adhesives based on conventional alkaline dispersions of poly-2-chlorobuta-1,3-diene, which have a low content of groups crosslinkable by isocyanate.

These alkaline dispersions corresponding to the prior art have only a low content of groups crosslinkable by isocyanate, so the increase in heat stability achievable by reaction with isocyanates is only small.

EXAMPLES

The following Examples serve to illustrate the invention in greater detail. All percentages are by weight.

A) Starting materials:

Polyisocyanate 1 (For Comparative Examples 1 and 1a)

Polyisocyanate prepared by the trimerization of 1,6-diisocyanatohexane and containing isocyanurate groups, which consists essentially of tris(6-isocyanatohexyl) isocyanurate and its higher homologues. The NCO content is 21.6%, the average functionality is about 3.5 and the monomeric diisocyanate content is <0.3%. The free NCO groups are all primary.

Polyisocyanate 2 (For Comparative Examples 2 and 5)

1000 g of polyisocyanate 1 are rendered hydrophilic by reaction with 130 g of a methanol-started polyethylene oxide polyether of molecular weight 350. The NCO content is then 17.4% and the monomeric diisocyanate content is <0.3%. The free NCO groups are all primary.

Polyisocyanate 3 (For Examples 3 and 7 to 10 According to the Invention)

1000 g of an isocyanato-isocyanurate with an NCO content of 16.6% and an average functionality of ca. 3.5, obtained by the trimerization of IPDI, are rendered hydrophilic by reaction with 150 g of a methanol-started polyethylene oxide polyether of molecular weight 490. The NCO content is then 13.2%. To lower the viscosity, the product obtained is diluted by the addition of 30% of a 1:1 methoxypropanol/xylene mixture. After dilution the NCO content is ca. 9.5% and the viscosity is ca. 700 mPa.s. The majority of the free NCO groups are secondary.

Polyisocyanate 4 (For Comparative Examples 4 and 11)

Polyisocyanate prepared by the trimerization of IMCI and containing isocyanurate groups. The NCO content is ca. 14.7% and the functionality is ca. 3.3; the residual monomeric diisocyanate content is <0.5%. The viscosity is lowered by dilution with 30% of methoxypropyl acetate. After dilution the NCO content is ca. 11.3%. The viscosity of the solution is 25,000 mPa.s. The free NCO groups are essentially tertiary.

Polychloroprene Dispersion Used

The polychloroprene dispersions used are described in Table 1 by the names CR-Dispersion 1 to 4.

The experiments were carried out with Dispercoll C 84. Dispercoll C 84 is a commercially available emulsion polymer of 2-chlorobutadiene with a pH of 11 to 13 (manufactured by Bayer AG, Leverkusen). For some of the experiments, Dispercoll C 84 was aftertreated by storage at 50° to effect the hydrolytic elimination of some of the chlorine atoms bonded to the polymer chain. The extent of the hydrolytic elimination of Cl is shown by the Cl⁻ content of the dispersion (determined by argentometric titration):

TABLE 1

| | Storage at 50° C. (days) | pH | Chloride content (ppm) |
|---|---|---|---|
| CR-Dispersion 1 | original product | 13 | 293 |
| CR-Dispersion 2 | 2 | 12.3 | 584 |
| CR-Dispersion 3 | 4 | 12.2 | 805 |
| CR-Dispersion 4 | 8 | 11.5 | 1140 |

B) Adhesive formulation:

The adhesive formulation given in Table 2 was used for all the bonding experiments. Emulvin W and Vulkanox DDA are commercial products from Bayer AG. Oulotack 90 D is a commercial product from Veitsoluoto (Finland).

TABLE 2

| Product | Function | Used as | Content | Parts by weight |
|---|---|---|---|---|
| CR Dispersion (1 to 4) | polymer | dispersion | 55% | 100 |
| Emulvin W | emulsifier | solution | 20% | 2 |
| Zinc oxide, active | stabilizer | dispersion | 50% | 4 |
| Vulkanox DDA-EM 50 | antioxidant | dispersion | 50% | 2 |
| Oulotack 90 D | resin | dispersion | 52% | 30 |

C) Carrying-out of the coagulation experiments:

A 1 l three-necked glass flask is equipped with a stirrer and a glass electrode for measuring the pH. 500 g of CR-Dispersion 1 are placed in the flask and the stirrer speed is adjusted to ca. 500 rpm. pH measurement indicates the pH of the dispersion after a short time. With the stirrer running, 25 g of the polyisocyanate to be studied (polyisocyanates 1 to 4) are then added to the dispersion over 1 minute. The change in pH, with the stirrer running, is recorded as a function of time. In the case of polyisocyanates 1 and 2, coagulation is seen to occur fairly suddenly after some time and rapidly leads to complete solidification of the contents of the flask. The electrode and stirrer must be removed from the mixture in good time.

TABLE 3

| Example | Polyisocyanate studied | pH at the start of measurement | pH at the end of measurement | Coagulation after (min) |
|---|---|---|---|---|
| 1 (comparative) | 1 | 11 | 9.9 | 160 |
| 1a (comparative) | 1 | 11 | after 100 minutes the pH was brought back to 11 by the addition of NaOH 10.7 | 160 |
| 2 (comparative) | 2 | 11 | 9.1 | 250 |
| 3 (according to the invention) | 3 | | 9.3 | no coagulation after 430 min |
| 4 (comparative) | 4 | 11 | 9.5 | no coagulation after 350 min |

Overall Results of the Coagulation Experiments

Over a period of up to 250 minutes, the two Comparative Examples based on polyisocyanates 1 and 2 containing primary NCO groups (Comparative Examples 1 and 2) show coagulation which leads to complete solidification, independently of whether the polyisocyanate is rendered hydrophilic.

By contrast, the mixtures with the polyisocyanates according to the invention, 3 (Example 3 according to the invention, secondary NCO groups) and 4 (Comparative Example 4, tertiary NCO groups), show no signs of coagulation, even after 350 or 450 minutes. After this time, these mixtures still present no problems of application to a substrate and bonding.

The drop in pH which occurs after the addition of isocyanate is a consequence of the isocyanate/water reaction; the $CO_2$ formed in this process neutralizes part of the base present, thereby causing the pH to fall. However, the initial and final values of the pH measurements are close to one another for all the polyisocyanates, so this drop in pH cannot be regarded as the cause of coagulation. Comparative Example 1a makes this particularly clear. Here, despite the pH being raised by the addition of NaOH, coagulation occurred after the same time as for the batch in Comparative Example 1, where the pH was not raised. In this respect the difference between the polyisocyanates, and the special position of polyisocyanate 3 according to the invention, are unpredictable and absolutely surprising. Polyisocyanate 4, containing predominantly tertiary NCO groups, does not lead to coagulation either. However, it will be shown in the bonding experiments D) that it has an insufficient reactivity for crosslinking.

D) Carrying-out of the bonding experiments:

5 g of the crosslinking isocyanates are added to 100 g of adhesive formulation from Table 2 and the ingredients are thoroughly mixed with a small propeller stirrer. Because of the solvent which may be present in the polyisocyanate, there can be a slight viscosity increase here which has nothing to do with the time-dependent coagulation. The 2K adhesive mixture obtained is then applied with a brush to freshly roughened SBR (NORA, test material from Freudenberg, Weinheim, Germany). The coated test pieces are left to dry for 1 hour at room temperature and ca. 50% relative humidity.

Two of the test pieces are heated for 4 sec with an infrared activator from Funk (Dr. Ing. Funk GmbH, 8000 Munich, Germany), the surfaces coated with adhesive are brought together and the test pieces are immediately pressed together under a surface pressure of 4 kg/cm$^2$.

After compression the bonded test pieces are stored for 1 week at room temperature/50% relative humidity and then tested in the tension shear test for heat stability (softening point according to ASTM D 816) and in the peel adhesion test for peel strength on the basis of DIN 53 273. Each experimental value given in Table 4 is a mean of 5 individual measurements.

TABLE 4

| Example | CR-Dispersion | Polyisocyanate | Peel strength on the basis of DIN 53 273 (N/mm) | Softening point according to ASTM D 816 (° C.) |
|---|---|---|---|---|
| 5 (comparative) | 1 | 2 | — | 58 |
| 6 (comparative) | 1 | none | — | 59 |
| 7 (comparative) | 1 | 3 | 4.9 | 78 |
| 8 (according | 2 | 3 | 5.4 | 88 |

TABLE 4-continued

| Example | CR-Dispersion | Polyisocyanate | Peel strength on the basis of DIN 53 273 (N/mm) | Softening point according to ASTM D 816 (° C.) |
|---|---|---|---|---|
| to the invention) | | | | |
| 9 (according to the invention) | 3 | 3 | 5.7 | 91 |
| 10 (according to the invention) | 4 | 3 | 6.1 | 111 |
| 11 (comparative) | 3 | 4 | — | 50 |

Overall Results of the Bonding Experiments

Comparative Example 5 shows that the combination of CR-Dispersion 1 and polyisocyanate 2, not according to the invention, which contains primary NCO groups, is not only unsuitable because of coagulation (cf. Table 3, Examples 1, 1a and 2) but also leads to a low heat stability of the adhesive because of a lack of crosslinkability of the dispersion.

Examples 8 to 10 prove on the one hand that polyisocyanate 3 according to the invention, which contains secondary NCO groups, not only does not cause coagulation of the adhesive mixture (cf. Table 3, Example 3) but also gives bonds with high peel strengths and, in particular, with a high heat stability (compared with the uncrosslinked adhesive in Example 6). On the other hand, the reactivity of polyisocyanate 4, which contains tertiary NCO groups, is too low for crosslinking of the adhesive (Comparative Example 11).

A comparison of Examples 7 to 10 further proves that, after the hydrolytic elimination of some of the Cl atoms from the polymer, alkaline dispersions of 2-chlorobuta-1,3-diene polymers make it possible to prepare adhesives having an appreciable additional crosslinkability with isocyanates. The crosslinkability (cf. Table 4) (measured as the peel strength and, in particular, the heat stability of the bond (softening point)) is directly related to this elimination, which can be measured from the chloride content of the dispersion (cf Table 1).

What is claimed is:

1. Aqueous crosslinking polymer dispersions, characterized in that they consist of A) 98 to 80 wt. % of a 40 to 60% aqueous alkaline polymer dispersion based on 2-chlorobuta-1,3-diene, with a pH of $\geq 9.5$ and a chloride content, arising from the elimination of chlorine atoms from the polymer, of $\geq 300$ ppm, and B) 2 to 20 wt. % of polyisocyanates obtained by the cyclotrimerization of aliphatic and/or cycloaliphatic diisocyanates, containing NCO groups bonded predominantly or exclusively as secondary groups.

2. Aqueous crosslinking polymer dispersions according to claim 1, characterized in that they contain 95 to 90 wt. % of component A) and 5 to 10 wt. % of component B).

3. Polymer dispersions according to claim 1, characterized in that the chloride content of component A), arising from elimination from the polymer, is $\geq 400$ ppm.

4. A water-based adhesive comprising the dispersion of claim 1.

* * * * *